United States Patent
Deas

(10) Patent No.: US 7,427,933 B2
(45) Date of Patent: Sep. 23, 2008

(54) DATA ENTRY DEVICE

(75) Inventor: Scott H. Deas, Dundee (GB)

(73) Assignee: NCR Corporation, Dayton, OH (US)

( * ) Notice: Subject to any disclaimer, the term of this patent is extended or adjusted under 35 U.S.C. 154(b) by 193 days.

(21) Appl. No.: 11/273,481

(22) Filed: Nov. 14, 2005

(65) Prior Publication Data

US 2007/0109149 A1 May 17, 2007

(51) Int. Cl.
*H03M 11/00* (2006.01)

(52) U.S. Cl. .............................. 341/22; 341/67; 710/67; 715/811

(58) Field of Classification Search ................... 341/20, 341/22, 67; 710/67; 715/811
See application file for complete search history.

(56) References Cited

U.S. PATENT DOCUMENTS

| | | | |
|---|---|---|---|
| 5,818,437 A * | 10/1998 | Grover et al. ............... | 715/811 |
| 6,172,625 B1 * | 1/2001 | Jin et al. ..................... | 341/67 |
| 6,286,064 B1 * | 9/2001 | King et al. ................... | 710/67 |
| 6,646,572 B1 * | 11/2003 | Brand ......................... | 341/22 |
| 7,083,342 B2 * | 8/2006 | Griffin ........................ | 400/485 |
| 2003/0179930 A1 | 9/2003 | O'Dell et al. | |
| 2004/0164951 A1 | 8/2004 | Lun Pun et al. | |

FOREIGN PATENT DOCUMENTS

GB 2 373 907 A 10/2002
WO WO 2004/010674 A1 1/2004

* cited by examiner

*Primary Examiner*—Albert K Wong
(74) *Attorney, Agent, or Firm*—Priest & Goldstein PLLC

(57) ABSTRACT

A self-service terminal alphanumeric data entry device comprises a multi-button input device and processing circuitry comprising a letter selector. At least one of the buttons is associated with a number and with at least two alphabetic letters. The input device is arranged to operate in a number entry mode wherein actuation of a button inputs the number associated therewith and a text entry mode. In the text entry mode, actuation of a button causes the letter selector to chose, from the letters associated with that button, the letter which has the highest probability of forming a word.

20 Claims, 3 Drawing Sheets

DATA ENTRY DEVICE

The present invention relates to a self-service terminal data entry device and, in particular but not exclusively, to a data entry device for Automated Teller Machines (ATM).

BACKGROUND

Self-service terminals such as ATMs have become increasingly commonplace and are well liked by users for their convenience and ease of use. For example, a bank account holder need no longer enter a bank, queue and interact with a bank clerk in order to withdraw money from a bank account. Instead, a card is inserted into an ATM, usually located on the street, and the instructions on a screen followed until money is dispensed therefrom, whether or not the bank is open. In addition, a host of other services are available from obtaining account information to topping up phone cards.

However, there are limitations to the uses of self-service terminals. Returning to the example of ATMs, an account holder will likely still have to enter the bank to transfer money between accounts, and to fill out changes in their details, such as change of address and the like. This is due in part to the general preference for such terminals to be as small and simple as is possible. Therefore, most such terminals have a simple 9- or 10-button number pad, with a limited number of further control buttons (typically on the order of ten), to control operation of the terminal.

Some ATMs are provided with a keyboard to allow for transactions such for bill payment and funds transfer. Terminals with keyboards are more commonplace is some countries (for example, Italy) than others. Despite the increased functionality, it is not desirable to make such terminals commonplace as each existing terminal would have to be replaced or modified and may require re-siting or enlargement of the 'hole in the wall' in which they are sited. This would be a costly exercise. Further, users could be discouraged by an unfamiliar terminal.

Some ATMs are provided with number pads arranged to allow text entry using an alphanumeric system and a 'multi-tap' input. Using multi-tap input, number keys can be used to input letters. For example, the number 2 can be used to provide an 'a', 'b' or 'c' by tapping once for 'a', twice in quick succession for 'b', a third tap giving 'c'. Generally, each of the keys 2 to 9 are associated with letters, the number 1 provides punctuation and the 0 provides spaces.

It will also be appreciated that a key concern in the provision and use of self-service terminals, for example ATMs and the like, is security. An individual's security can be compromised by the fact that, while their attention is fixed on interactions with the ATM, they are vulnerable to attack. An attacker may cause them physical harm, steal items either with threats or by picking their pocket and may intimidate the user into handing over any money they have or are able to withdraw from the terminal. Furthermore, some criminals set up cameras or stand close to ATM users to watch as they enter their security code, typically a four-digit Personal Identification Number (PIN), and then steal the card from the user to withdraw funds from the user's account. It is also possible to 'skim' bankcards by placing a magnetic reader over the bankcard entry slot, then using the information to manufacture a duplicate card. It is clearly desirable to increase the security of a user of an ATM, both for the personal wellbeing of the user and for the ATM service provider.

SUMMARY

It is an object of the present invention to mitigate at least one of the above detailed problems.

According to a first aspect of the present invention there is provided a self-service terminal alphanumeric data entry device comprising a multi-button input device and processing circuitry comprising a letter selector, wherein at least one of the buttons is associated with a number and with at least two alphabetic letters, the input device being arranged to operate in a number entry mode wherein actuation of a button inputs the number associated therewith and a text entry mode wherein actuation of a button causes the letter selector to chose, from the letters associated with that button, the letter which has the highest probability of forming a word.

This is advantageous as terminals incorporating a prior art data entry device (for example, a PIN-pad on an ATM) could be refurbished with a data entry device according to the invention. This could be a hardware replacement, which is advantageous over the alternative, the addition of a keyboard, as the physical surrounding of the data entry device would not have to be altered. Alternatively, a terminal could be updated with new software, in which case no physical changes would have to occur, making the operation simple and cheap to perform.

Further, so-called 'predictive text input' wherein the letter which has the highest probability of forming a word is chosen is well understood by both the man skilled in the art and by most users, who will be familiar with the techniques from, for the main part, text messaging using mobile telephones. Therefore, the user will not be discouraged by being presented with an unfamiliar technology and yet will be presented with a terminal with increased functionality.

Data may be entered more quickly than using a multi-tap method and therefore the personal safety of the users may be increased.

Further, the functionality of the self-service terminal may be increased without adding to its size.

The processing circuitry preferably comprises a dictionary of words and the letter selector is arranged to choose the letter with the highest probability of forming words from the dictionary.

This is advantageous as the dictionary could contain likely vocabulary that a user may wish to input and therefore the letter selector will be able to better determine words as letters are entered.

The letter selector may be arranged to choose a letter based on the probability of the use of a word in a given context.

This is advantageous as the letter selector will be more likely to select a letter from a word the user intended to input.

The context may be provided by one or more of the following: the user's identity, data previously entered by a user, the type of information being input, geographical location of the self-service terminal, or the like. Such information is likely to help in selecting probable words.

The processing circuitry may comprise a dictionary filter arranged to filter the dictionary to form a subdictionary of probable words given the context. This may increase the speed of selecting a letter (as selection is being made from a smaller group of words) and likelihood that the letter selector will select a letter from the word that the user wishes to enter.

The self-service terminal may be an Automated Teller Machine (ATM).

According to a second aspect of the invention, there is provided an Automated Teller Machine comprising a data entry device according to the first aspect of the invention.

According to a third aspect of the present invention, there is provided a network comprising a plurality of self-service terminals, each of which is capable of transmitting data to and/or receiving data from at least one other terminal over a communication link, wherein at least one of the terminals comprises a multi-button input device, at least one of the buttons of the input device being associated with a number and with at least two alphabetic letters, the network further comprising processing circuitry comprising a letter selector, the input device being arranged to operate in a number entry mode wherein actuation of a button inputs the number associated therewith and a text entry mode wherein actuation of a button causes the letter selector to chose, from the letters associated with that button, the letter which has the highest probability of forming a word, the network being arranged such that data indicative of an input using a multi-button input device at one self-service terminal is available to at least one other terminal in the network.

This is advantageous as it allows data input at one self-service terminal to be shared and/or distributed across the network which is useful as a user will not always use the same self-service terminal.

The processing circuitry may have any of the features described in relation to the first aspect of the invention.

In some embodiments, the processing circuitry may be located in one or more of the self-service terminals of the network which comprise a multi-button input device. It is advantageous to locate the processing circuitry in the self-service terminal as providing the processing circuitry close to the input device may reduce the response time to inputs made using the input device compared to a system employing remote processing circuitry. Further, the system does not then rely on the integrity of an 'always on' remote communication link between the terminal and the processing circuitry to process each input made.

The network may further comprise a server arranged to receive data from and/or transmit data to one or more of the self-service terminals of the network. This is a convenient means both to co-ordinate the distribution of data and to provide further data for transmission and/or distribution over the network (for example, changes to program data or changes to a users details made using a means other than the self-service terminal).

The processing circuitry may be located on the server. This is advantageous as centralized processing circuitry is easy to maintain and any changes made can apply across the entire network without each terminal being reprogrammed.

The processing circuitry may be distributed between one or more of the terminals and/or the server. For example, the dictionary could be stored on the server and the dictionary filter may be stored on at least one terminal.

The network could be arranged to transmit data indicative of an input as it is entered, at the end of an interaction with a user, periodically, for example once an hour, once day or the like, or on receipt of a signal.

The network may comprise a wireless network, a local area network, an ad hoc network, an intranet, the Internet, or the like. It will be appreciated that ATMs are usually connected via private networks (rather than public networks, such as the Internet) for security reasons.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
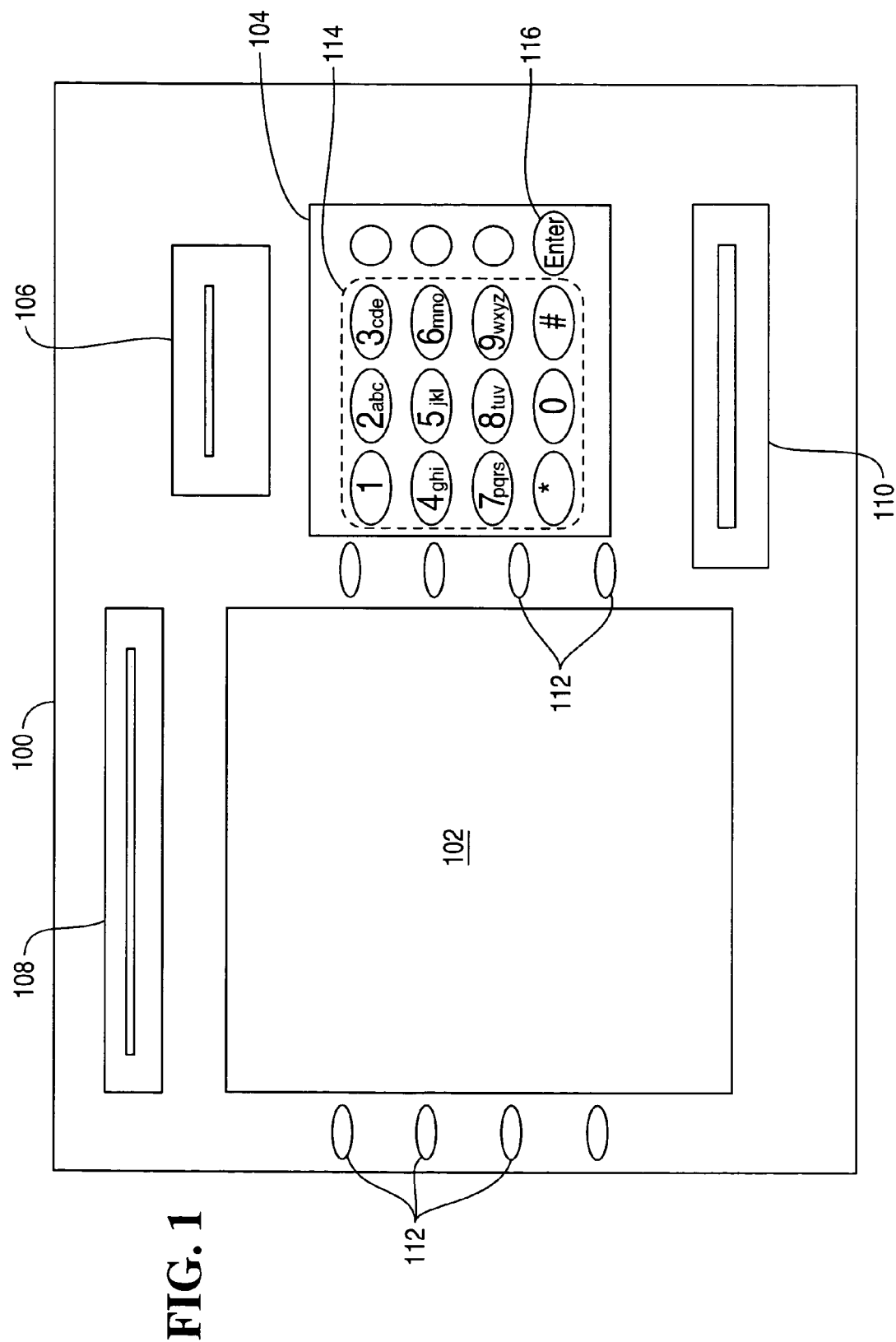
FIG. 1 shows an Automated Teller Machine (ATM) with a multi-button input device.

FIG. 1 shows the front face of a self-service terminal according to one embodiment of the present invention, in this example an Automated Teller Machine (ATM) 100. The ATM 100 comprises a display means 102, which in this example is a cathode ray tube display means, a PIN-pad 104, which provides a multi-button input device, a bankcard slot 106, a deposit slot 108, a cash dispenser slot 110 and menu selection buttons 112.

The PIN-pad 104 comprises ten alphanumeric buttons 114, which can be used to input numbers while in a first, number entry, mode of operation or alphabetic letters while in a second, text entry, mode of operation. The PIN-pad 104 further comprises an 'Enter' button 116, which can be used to indicate that a user is satisfied with the data input using the alphanumeric buttons 114.

Figure 2:
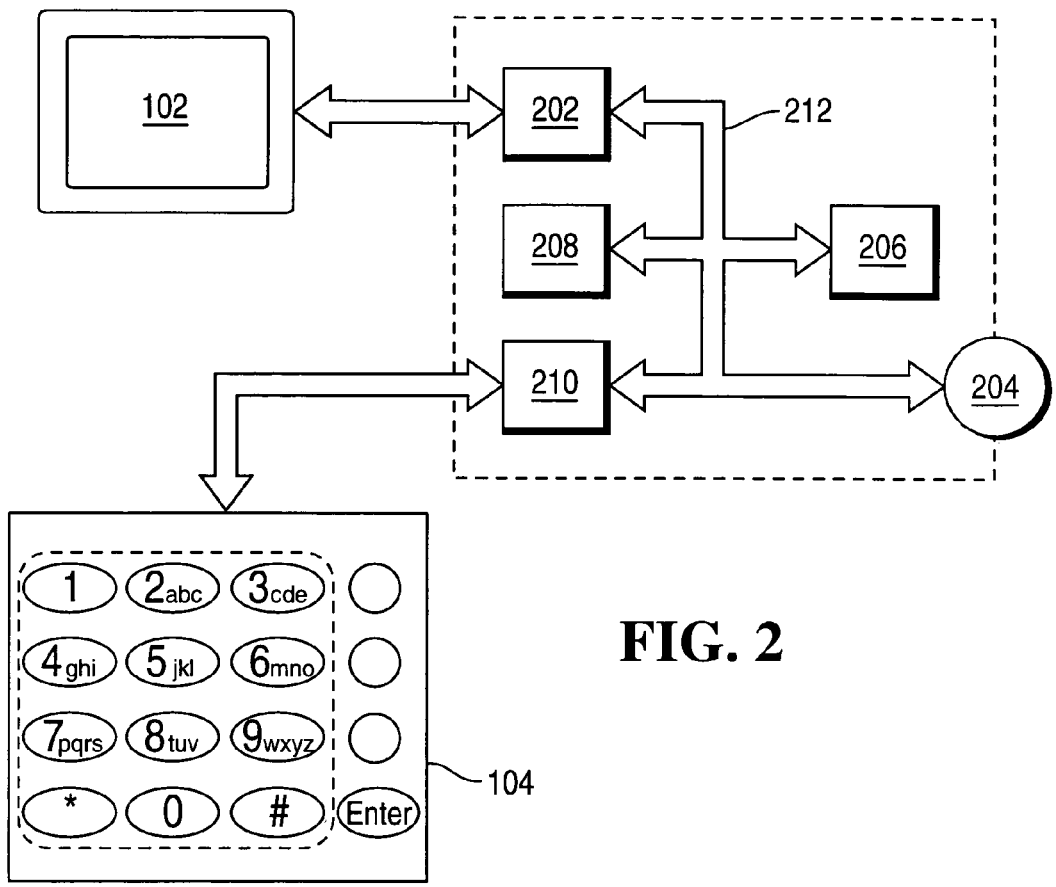
FIG. 2 shows schematically the components of a processing circuitry according to one embodiment of the present invention.

FIG. 2 shows the components of processing circuitry 200 arranged to control the operation of the ATM 100 of FIG. 1. The processing circuitry 200 comprises a display driver 202, a maintenance/IP port 204, a hard drive 206, a memory 208 and an I/O subsystem 210. The display driver 202, maintenance/IP port 204, hard drive 206, memory 208 (described in greater detail below) and I/O subsystem 210 communicate with one another via a system bus 212 in a manner well understood by those skilled in the art. The maintenance/IP port 204 is arranged to allow data including program data to be input and to be exported, either to/from a local external device (such as an engineer's computer) or transmitted over a network as expanded upon hereinafter with reference to FIG. 4.

Figure 3:
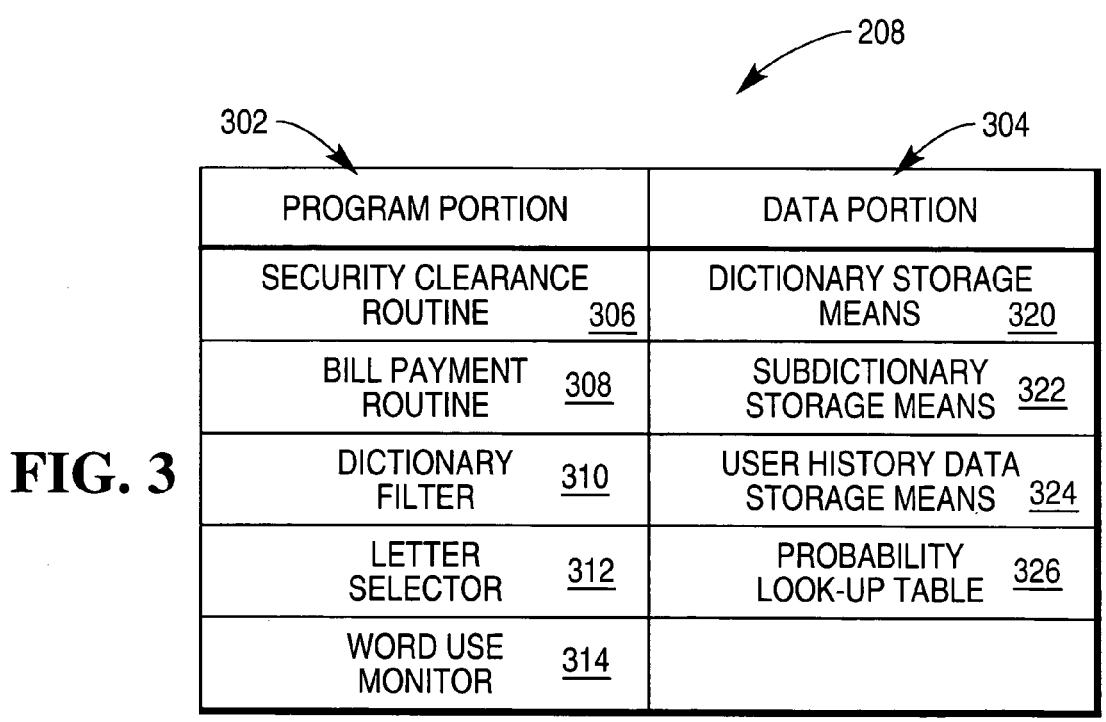
FIG. 3 shows details of the memory of the processing circuitry of FIG. 2.

As shown schematically in FIG. 3, the memory 208 comprises a program storage portion 302, allocated to program storage and is used to hold blocks of program code that can be used to cause the ATM 100 to perform predetermined actions. In this embodiment, the program code comprises a security clearance routine 306, a bill payment routine 308, a dictionary filter 310, letter selector 312, and a word use monitor 314.

The functions of these blocks will be expanded upon hereinafter.

The memory 208 further comprises a data storage portion 304, allocated to holding data and in this embodiment comprises a dictionary storage means 310, a subdictionary storage means 322, a user history data storage means 324 and a probability look-up table 326. Again, the function of these portions of the database means will be expanded upon hereinafter.

Figure 4:
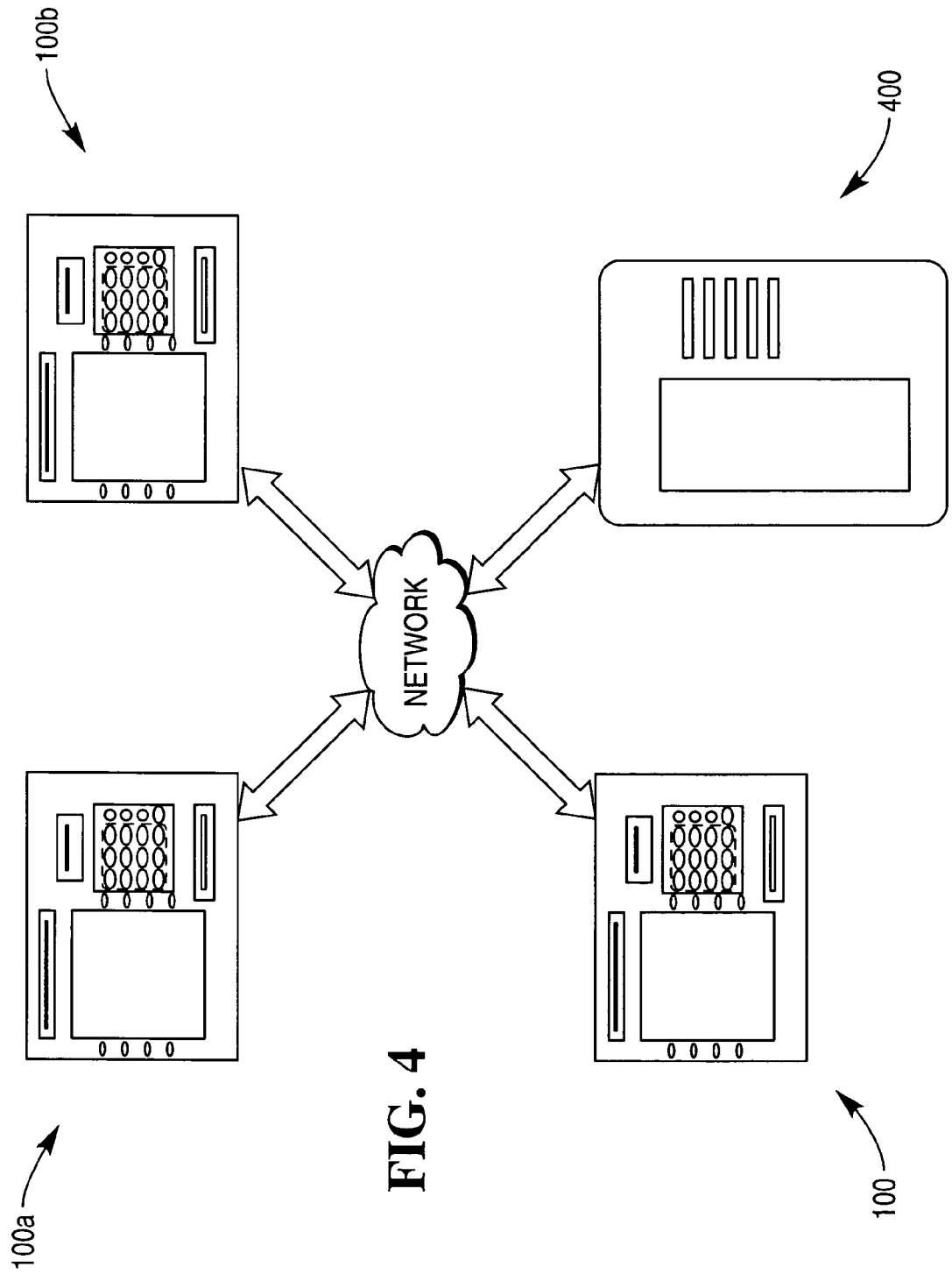
FIG. 4 shows a network of ATMs.

As is shown schematically in FIG. 4, the ATM 100 is connected via a wireless network to other ATMs 100a, 100b and to a server 400. The server 400 is arranged to control data sent over the network (which therefore provides a communication link) and can distribute data to the ATMs 100, 100a, 100b connected to the network.

An example of use of the ATM 100 follows. It will however be appreciated that the terminal may be arranged to perform functions not described herein, for example, printing account statements, ordering statements, changing Personal Identification Number (PIN), or the like.

In use of the ATM 100, a user inserts his/her bankcard into the bankcard slot 106. This action causes an input to the I/O subsystem 210, which causes the processing circuitry 200 to fetch and run the program code providing the security clearance routine 306 stored in the memory 208. The security clearance routine 306 ensures that the ATM 100 is in its number entry mode and the display means 102 is controlled by the display driver 202 to display a prompt for the user to enter his/her PIN. The user may do so buy pressing the alphanumeric buttons 114 of the PIN-pad 104, then pressing the 'Enter' button 116, which inputs numbers associated with the button(s) pressed to the I/O subsystem 210. The security clearance routine 306 then verifies the PIN is correct for that bankcard in a manner well understood in the art, and, assuming that the PIN has been entered correctly, causes the display driver 202 to control the display means 102 to display a menu of options. Each item on the menu is displayed on a portion of the display means adjacent to a menu selection button 112. The user may select from this menu by pressing the menu selection button 112 adjacent to the position of that option shown on the display means 102.

In this example, the user selects an option to 'Pay a Bill', which causes the processing circuitry 200 to fetch and run the program code providing the bill payment routine 308 stored in the memory 208. The bill payment routine 308 causes the display driver 202 to control the display means 102 to display a menu of options of bill types, for example Council Tax, Water, Gas, Electricity or Other. The user selects from this menu by pressing the menu selection button 112 closest to the position of the desired bill type shown on the display means 102. The choice of bill provides a context for the processing circuitry 200 to use in predicting words and selecting letters.

Once the choice of Bill type has been made, the dictionary filter 310 is employed to select words from the dictionary in the dictionary storage means 320 which are associated with that Bill type to develop a subdictionary for storage in the subdictionary storage means 322. For example, if the selected bill type is a gas bill, the subdictionary storage means 322 will be populated by the dictionary filter 310 with the names of the major gas suppliers but not with the names of water boards or local councils.

The dictionary filter 310 is further arranged to access the user history storage means 324, which holds data of previous transactions performed using the ATM 100 for that user. For example, if the last time the user paid a gas bill it was to a specified company, it is likely (but not certain) that the bill will be paid to the same company this time. Therefore, the probability look-up table 326 can be populated with a higher probability associated with the name of the specified company than with other gas companies.

The Bill payment routine 308 causes the display driver 202 to control the display means 102 to display a data entry form with a number of data entry fields, asking for the identity of the company to be paid, the amount, the payment date, etc. The user is instructed to enter data into each field in turn and then press the 'Enter' button 116 of the PIN-pad 104. The Bill Payment routine 308 ensures that the ATM 100 is operating in a text entry mode.

For the purposes of example, the user is paying a gas bill and therefore the first data entry field requests the name of the gas company. As an example only, the user is paying a bill issued by Scottish Power. However, last time the user paid a bill, it was to Powergen.

To enter the company name, the user presses the button marked "7-pqrs' on the PIN-pad. This causes the letter selector 312 to consider which of the letters associated with that button, i.e. p, q, r and s is most likely to appear in the finished word. In order to do this, the letter selector 312 considers which of the words starting with those letters is the most likely. There are a number of gas companies to choose from, for example: Powergen, Sainsbury's energy, Scottish Power, Seeboard Energy, SWEB energy and others. However, as the previous bill was paid to Powergen, the probability that the finished word will be 'Powergen' is higher than the other company names and a 'P' is entered into the data entry field. Indeed, in this example, the whole company name is entered into the data entry field as the most likely word, given the context. This is known in the art of predictive text data entry as 'word completion'.

If the user was paying a bill to Powergen, the 'Enter' button 116 could be pressed to proceed to the next data entry field. However, this is not the case, so the user continues by pressing the button on the PIN-pad marked 2-abc, in an effort to produce the second letter, a 'c' in Scottish Power. From this, the letter selector 312 can deduce that the word with the highest probability is not the correct word. Therefore, it locates in the subdictionary words with the first letter p, q, r, or s and with the second letter a, b or c. In this example, there are two company names which match this: Sainsbury's energy, Scottish Power. As there is no user history data in relation to either name, the letter selector 312 selects the first alphabetically, an 'a' and the completed company name, 'Sainsbury's Energy', is displayed in the data entry field.

This is still not the desired company name, so the user presses the button marked '6-mno' on the PIN-pad 104 in an effort to produce the third letter, an 'o' in Scottish Power. The letter selector 312 deduces that the previously completed word is not the correct word. Therefore, it locates in the subdictionary words with the first letter p, q, r, or s and with the second letter a, b or c and the third letter m, n or o. The only option is 'Scottish Power' and this is displayed in the data entry field.

The user then presses the 'Enter' button 116 on the PIN-pad 104 to proceed to the next data entry field, which in this case is 'Amount to Pay', which has two sections, one for pounds, the other for pence. The Bill Payment routine 308 ensures that the ATM 100 is operating in its number entry mode and the user can enter the amount required, pressing enter to move from the 'pound' section to the 'pence' section.

The next data entry field is 'Date on which Payment should be made', which comprises three sections of day, month and year. The data entry field is populated with the day's date, which can be accepted by pressing the 'Enter' button 116. Alternatively, the date can be changed by entering the preferred day in the first section (the ATM 100 is operating in its number entry mode whilst this section is completed). To select the month, the user enters the Month section and the ATM is placed into text entry mode. The user enters numbers corresponding to letters in the month section until the month can be uniquely identified. The names of the months form part of a subdictionary with the initial highest probability being associated with the current month, the second highest for the next month and so on, as bills are likely to be paid in the near future. However, if the day is changed to a number lower than the present date, the probability look-up table is re-populated such that the next month becomes the most likely.

Once the data entry fields are filled in to the user's satisfaction, the user may press the 'Enter' button 116 on the PIN-pad 104. The word use monitor 214 looks for new words used, in this case the new gas company Scottish Power, and updates the user historical data such that next time the user pays a gas bill, 'Scottish Power' will be identified as the most likely company. Further, this information is exported over the maintenance/IP port 204 via the Network the server 400, which distributes the information to other ATMs 100, 100a, 100b connected to the network via their maintenance/IP ports 204 of other ATMs 100.

In the above example, the subdictionary of gas company names will likely form a complete list of the gas companies it is possible that the user will want to pay. However, in other uses of the ATM 100, this may not be the case. For example, a user could use the ATM 100 to effect a change of address. In this case, there may be a subdictionary comprising local street and house names but, on occasion, the street or house name is not in either the full dictionary or the subdictionary. In this case, a user may have to 'spell' the name, using the PIN-pad as a 'multi-tap' data entry device. In such cases, the '2-abc' button must be tapped once for an a, twice for a b and so on.

Alternative embodiments which fall within the scope of the invention may be readily apparent to the skilled person. For example, the data entry fields may not be filled in with a default value either initially or after entry of a letter. Or the data entry fields may only be filled in if there is a high level of certainty associated with a particular word being the finished word. The system may not find the probability of the finished word at all, but instead work using the likelihood that a particular letter is the correct letter, rather than considering finished words.

The subdictionaries could be developed dynamically or maintained overtime. Subdictionaries could be associated with a particular user, area and/or the instant use of the terminal (e.g. what type of bill is being paid).

Other features familiar from prior art applications of predictive text generation may be used. For example, a user may be able to move through a list of words that match the alphanumeric input made, if more than one word is known. It may be possible for the user to switch the self-service terminal between data entry modes (for example, it may be possible to switch from text to number entry mode by holding down the button relating to that number).

The system may be arranged to perform some or all of the data processing on the server 400 rather than at the ATM. In such an embodiment, the server 400 will be provided with a memory similar to that described in relation to the ATM 100 above.

What is claimed is:

1. An alphanumeric data entry device for a self-service terminal presenting data entry displays for completion by a user, the data entry device accepting inputs by the user for completion of data fields in the data entry displays, comprising:
    a multi-button input device, at least one of the buttons being associated with a number and with at least two alphabetic letters, the input device being arranged to operate in a number entry mode wherein actuation of a button inputs the number associated therewith and a text entry mode wherein actuation of a button causes selection and entry of a letter associated therewith, the input device being operative to accept entries for data fields in data entry displays comprising both text fields and numeric fields, the input device being set to a number entry mode when an entry is to be made to a numeric field and to a text entry mode when an entry is to be made to a text field; and
    processing circuitry identifying a field as a text entry field or a numeric entry field and automatically switching the multi-button input device between the text entry mode and the number entry mode during entry of data into a data entry display depending on whether the current field selected for receiving an entry is identified as a text field or a numeric field, the processing circuitry further comprising a letter selector, the letter selector being operative, upon actuation of the button when the input device is in the text entry mode, to choose, from the letters associated with the button, the letter which has the highest probability of forming a word.

2. An alphanumeric data entry device as claimed in claim 1, in which the processing circuitry comprises a dictionary of words, and the letter selector being arranged to choose the letter with the highest probability of forming words from the dictionary.

3. An alphanumeric data entry device as claimed in claim 1, in which the letter selector is arranged to choose a letter based on the probability of the use of a word in a given context.

4. An alphanumeric data entry device as claimed in claim 3, in which the context may be provided by one or more of the following: the user's identity, data previously entered by a user, the type of information being input, geographical location of the self-service terminal.

5. An alphanumeric data entry device as claimed in claim 3, in which the processing circuitry comprises a dictionary filter arranged to use the context filter the dictionary to form a sub-dictionary of probable words given the context.

6. An automated teller machine (ATM) comprising:
    a bank card slot;
    a deposit slot;
    a cash dispensing slot;
    a display presenting information screens for completion by a user, one or more of the information screens comprising both numeric and text fields for completion by the user;
    a multi-button input device, at least one of the buttons being associated with a number and with at least two alphabetic letters, the input device being arranged to operate in an entry mode wherein actuation of the button inputs the number associated therewith and a text entry mode wherein actuation of a button causes selection and entry of a letter associated therewith, the input device being operative to accept entries for data fields in information screens comprising both text fields and numeric fields, the input device being automatically set to a number entry mode when an entry is to be made to a numeric field and to a text entry mode when an entry is to be made to a text field; and
    processing circuitry identifying a field as a text entry field or a numeric field and to automatically switching the multi-button input device between the text entry mode and the number entry mode during entry of data into an information screen depending on whether the current field selected for receiving an entry is a text field or a numeric field, the processing circuitry further comprising a letter selector, the letter selector being operative, upon actuation of the button when the input device is in the text entry mode, to choose, from the letters associated with the button, the letter which has the highest probability of forming a word.

7. A network comprising:
    a communication link;
    a plurality of self-service terminals, each of which is capable of transmitting data to and/or receiving data from at least one other terminal over the communication link, wherein at least one of the terminals comprises a multi-button input device for accepting data entries for information screens comprising both numeric fields and text fields, at least one of the buttons of the input device being associated with a number and with at least two alphabetic letters, the input device being arranged to operate in a number entry mode wherein actuation of a button inputs the number associated therewith and a text entry mode wherein actuation of the button causes selection and entry of a letter associated therewith, the input device being automatically set to a number entry mode when an entry is to be made to a numeric field and to a text entry mode when an entry is to be made to a text field, the input device being operative to identify a field as a numeric field or a text field and to automatically switch between the text entry mode and the number entry mode during entry of data into an information screen depending on whether the current field selected for receiving an entry is a text field or a numeric field; and processing circuitry comprising a letter selector hosted on the network, the letter selector being operative, upon actuation of the button, to choose, from the letters associated with that button, the letter which has the highest probability of forming a word, the network being arranged such that data indicative of an input using the multi-button input device at one self-service terminal is available to at least one other terminal in the network.

8. A network as claimed in claim 7, in which the processing circuitry is located in one or more of the self-service terminals of the network which comprise a multi-button input device.

9. A network as claimed in claim 7, which comprises a server arranged to receive data from and/or transmit data to one or more of the self-service terminals of the network.

10. A network as claimed in claim 9, in which the processing circuitry is located on the server.

11. A network as claimed in claim 7, in which the processing circuitry is distributed between one or more of the terminals.

12. A network as claimed in claim 11, in which the processing circuitry is distributed between one or more of the terminals and the server.

13. A network as claimed in claim 7, which is arranged to transmit data indicative of an input over the network on different schedules, including as it is entered, at the end of an interaction with a user, periodically, or on receipt of a signal.

14. An ATM as claimed in claim 6, wherein the processing circuitry is operative to initiate a security clearance routine upon insertion of a user card into the bankcard slot, initiation of the security clearance routine setting the ATM to the number entry mode for entry of a user personal identification number (PIN).

15. An ATM as claimed in claim 14, wherein the processing circuitry is operative, upon successful entry of a user PIN, to control a display means to present a menu of options and upon selection of an option to control the display means from the menu of options causing presentation of a subsequent display, at least one display that may be presented being an information screen including numeric fields and text fields.

16. An ATM as claimed in claim 15, further comprising memory storing a dictionary of words for use in populating text fields and wherein the processing circuitry is operative to filter the dictionary to create a subdictionary of words associated with an information screen currently being presented.

17. The ATM as claimed in claim 6, wherein at least one information screen is a bill payment screen and the subdictionary includes words associated with the type of bill being paid.

18. The ATM as claimed in claim 16, wherein the processing circuitry is operative to select a word from the subdictionary for entry into a field upon a partial entry comprising letters making up a sufficient portion of the word to allow for prediction of the word.

19. An ATM as claimed in claim 18, wherein the processing circuitry is operative to predict a word based in part on a probability assigned to that word.

20. An ATM as claimed in claim 19, wherein a higher selection probability is assigned to words that have previously been used by the customer in association with the information screen currently being presented.

* * * * *